Oct. 18, 1927.
C. C. COLLETTE
1,646,347
PLAY BALL
Filed May 11, 1927
2 Sheets-Sheet 1
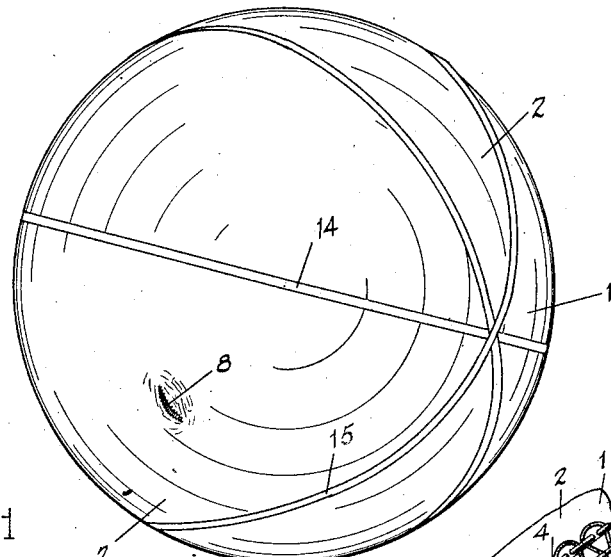
Fig 1
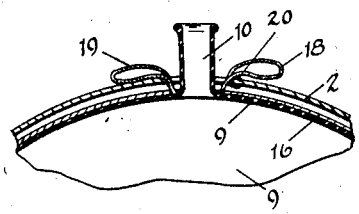
Fig 4
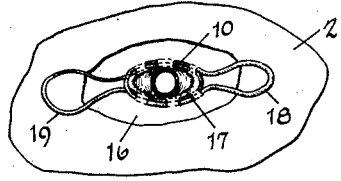
Fig 5
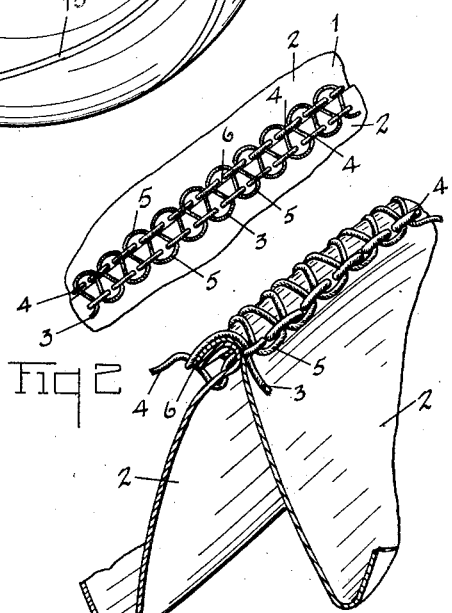
Fig 2
Fig 3
Inventor
Clarence C. Collette
By Faust F. Crampton
Attorney Oct. 18, 1927.  1,646,347
C. C. COLLETTE
PLAY BALL
Filed May 11. 1927  2 Sheets-Sheet 2

Inventor
Clarence C. Collette
By Faust F. Crampton.
Attorney

Patented Oct. 18, 1927.

1,646,347

UNITED STATES PATENT OFFICE.

CLARENCE C. COLLETTE, OF AMSTERDAM, NEW YORK.

PLAY BALL.

Application filed May 11, 1927. Serial No. 190,401.

My invention has for its object to provide a novel toy play-ball particularly adapted for house play of children. The invention particularly has for its object to produce a play-ball at exceedingly low cost of production whereby the ball may be sold at a very low price, such as, in 5 and 10 cent stores and yet to provide a ball that is exceedingly durable and will withstand the rough usage and pressure on its surface quite sufficiently to withstand rupture and puncture. The invention provides a casing formed of spherical sector strips of fabrics, such as, cambric, which are sewed together by a form of stitches that will render needless the time required for inversion and which will secure the sectors together in the form of a sphere and produce an attractive external appearance, and wherein is located a gum or rubber bladder that is expanded by insertion of air therein.

The gum bladder is provided with a neck through which air may be blown to distend the bladder. By my invention I provide an eyelet or slot or button-hole in one of the sector strips, through which the bladder may be inserted into the casing, leaving the neck protruding therethrough for filling the bladder, until the casing is distended to its limit. The casing will operate to prevent rupturing and puncturing of the bladder. The invention also provides a means for sealing the neck of the bladder and thus produce means for retaining the air that is forced or blown therein.

The invention may be contained in play-balls which differ in their details and, to illustrate a practical application of my invention, I have selected two or three play-balls containing the invention as examples of such play-balls that embody my invention, and shall describe them hereinafter. The particular play-balls selected are shown in the accompanying drawings.

Figure 6:
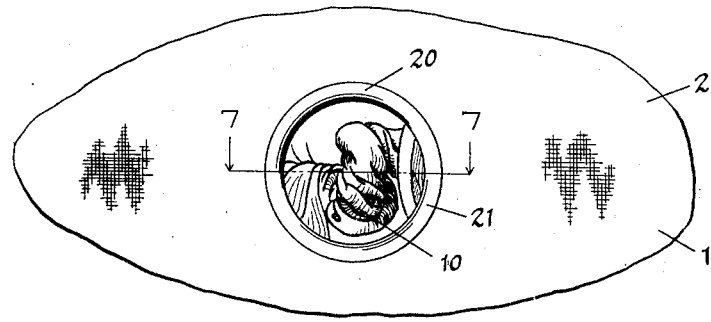
Figure 7:
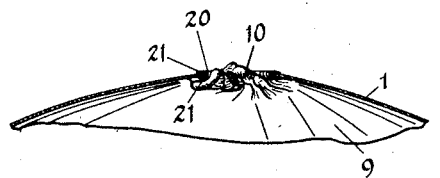
Figure 9:
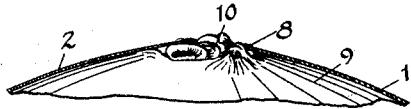
Figure 8:
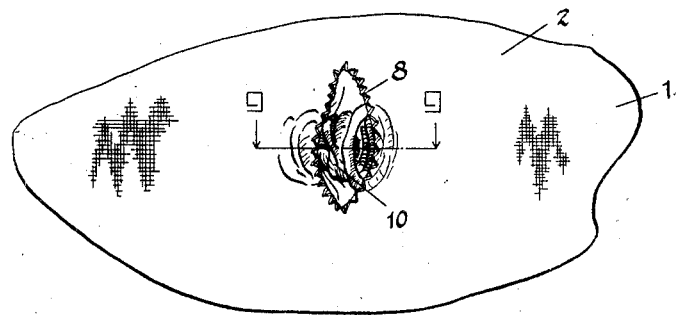

Fig. 1 of the drawing is a side view of one play-ball selected as an example. Fig. 2 illustrates a view of the stitching which, however, is shown enlarged in order to illustrate the manner in which the stitch is formed. Fig. 3 is a fragmentary view of two adjoining sector strips showing the stitches in position and the overlapping portions of the adjoining sectors. Fig. 4 is a view of a section of the casing taken at the point where the neck of the bladder is located in a form of construction other than that shown in Fig. 1. Fig. 5 is a top view showing the protruding neck of the bladder in the form of construction shown in Fig. 4, the other sector strip being broken away in order to show the means for sealing the neck of the bladder. Fig. 6 illustrates a view of a part of a third form of play-ball and shows an eyelet in which the neck of the bladder may be located. Fig. 7 is a view of a section taken on the plane of the line 7—7 indicated in Fig. 6. Fig. 8 is an enlarged view of a part of the ball illustrated in Fig. 1 and shows the twisted neck of the bladder and inserted within the casing for maintaining the bladder in its sealed condition. Fig. 9 is a view of a section taken on the plane of the line 9—9 indicated in Fig. 8.

The play-ball 1, shown in Figs. 1, 8, and 9, is formed of a plurality of sectors that may be formed of sheet fabrics and cut to substantially the form of spherical sectors. The strips 2 are sewed together at their edges and so that when they are assembled by sewing and when distended, they will produce a substantially spherical or ellipsoid form.

A short slit 8 is formed in one of the sectors, preferably, on a bias with respect to the cross fibers of the fabric from which the sector is cut. The edge of the slit is bound by a button-hole stitched thread to prevent fraying or tearing of the ends of the opening. This is done by two interlocking threads, one of which interlaces back and forth while the other catches and holds the loops on opposite sides of the overlapped areas of the adjoining sectors of the ball. The adjoining sectors of the balls are so placed as to overlap their edge portions and fold the overlapping edge portions together. When in this position the edge portions are sewed together by the two threads. The thread 3 is looped back and forth over the edges of the adjoining sectors as shown in Figs. 2 and 3, while at the same time the thread 4 catches the loops 5 that are formed in the thread 3. The thread 4 passes through adjoining loops 5 that are formed on each side of the edges 6 of the overlapping edge portions of the adjoining sectors. This covers the exposed edge and prevents fraying and at the same time produces an attractive cross stitching. If the cross stitch is made of colored thread it adds to the appearance of the casing. By thus locating the edge portions of the sectors of the casing and stitching them in the manner described, the necessity of turning and carefully finishing the opening through which the casing is turned, is entirely avoided, which greatly reduces the cost of production of the casing, and, consequently, the play-ball may be sold at a very low price.

A small opening 8 is formed in one of the sectors and the edge of the opening may be covered with the ordinary button-hole stitch to prevent fraying and tearing of the ends of the opening. The bladder 9 may be inserted through the opening 8 and the neck 10 may be left so as to protrude through the opening. The bladder may be blown up and the neck may be sealed by twisting it and then inserting it through the opening and between the wall of the casing and the wall of the bladder. The casing operates to limit the expansibility of the bladder and, consequently, greatly reinforces the bladder as against any exterior pressure when the bladder has been blown to the limit as determined by the size of the casing. Also the casing operates to prevent articles from cutting or puncturing the bladder in the ordinary use of the play-ball. When the bladder has been blown up and the neck twisted and inserted through the opening, the contact of the rubber of the bladder with the rubber of the neck together with the pressure that is exerted on the twisted neck prevents the neck from unwinding or untwisting. Consequently the play ball will be maintained in its expanded condition for a long period of time and will only become deflated as air may seep through the wall of the bladder.

In the form of construction shown in Figs. 6 and 7, an eyelet 20 of metal such as brass is formed in one of the sectors 2 of the play-ball in place of the button-hole 8. The eyelet 20 being of metal, it forms a rigid construction and also the construction operates to maintain the hole in the wall open. The inner diameter of the eyelet is made relatively large for insertion of the twisted neck of the bladder after the bladder has been expanded and the neck has been twisted. The eyelet 20 thus provides a rigid distended edge which enables the ready sealing of the play-ball. The eyelet 20 is of the usual construction, it being provided with two integrally joined flanges 21 that are located about the edge of the opening formed in the sector in which the eyelet is located. The flanges 21 operate to clamp the edge and thus prevent fraying of the edge.

In the form of construction shown in Figs. 4 and 5, the bladder may be sealed by means of drawing-strings that may be inserted between overlapping parts of the casing. If desired the portion of the casing between the seams 14 and 15 may be formed of two sector strips 2 and 16. The sector strip 16 at its edges in the stitching operation may be secured to the overlying sector 2. The outer sector may be provided with an eyelet 20 and the inner sector 16 may be provided with a button-hole 17, having its edges bound by the usual button-hole stitch and a pair of puckering strings 18 and 19 may be threaded around the opening 17, preferably on the outside of the button-hole stitching around the opening. The bladder 9 is inserted through the openings, leaving the neck 10 to protrude through the openings. When the bladder 9 is distended, the strings 18 and 19 may be drawn so as to close the neck 10 and thus seal the air within the bladder. The loops of the strings 18 and 19 may then be tied together so as to retain the air within the bladder. The neck 10 together with the strings 18 and 19 may then be tucked through the eyelet 20 and so as to press them between the outer and inner sectors 2 and 16.

I claim:

1. In a play-ball, a casing having a plurality of sectors formed of sheet fabric and having overlapping folded edge portions and secured together at their edges by two threads, one of which extends in zig-zag arrangement entirely over the top of overlapping portions of the said sectors and the other extending through the adjoining sectors to points outside of the overlapping areas to engage and retain the loops, a toy play-balloon located within the casing, the casing having an opening to receive the neck of the toy-balloon whereby the said ball may be distended by the insertion of air through the neck.

2. In a play-ball, a plurality of sectors formed of sheet fabric stitched together along their edges, the casing having two sectors between two adjoining seams, the said two sectors having openings substantially registering with each other, a bladder located in the casing and having its neck extended through the opening of the inner of the said two last named sectors, the inner of the said sectors having puckering strings for sealing the bladder and located about the said opening formed in the said inner of the sectors, the two sectors adapted to receive and enclose the puckering strings and the neck of the bladder.

3. In a play-ball, a casing having a plurality of sectors formed of sheet fabric and having overlapping folded edge portions, the folded edge portions secured together by outside sewed seams, one of the sectors having a slit formed therein, the edges of the slit bound by buttonhole stitch extending around the edge of the slit, a toy play-balloon located within the casing, the neck of the balloon extending through the slit.

4. In a play-ball, a casing having a plurality of sectors formed of sheet fabric and having overlapping folded edge portions, the folded edge portions secured together by outside sewed seams, one of the sectors having a short slit cut on the bias with respect to the cross threads of the fabric of which the sector is formed, the edges of the slit bound by a button-hole stitched thread, a toy play-balloon located within the casing, the neck of the balloon extending through the slit.

5. In a play-ball, a casing having a plurality of sectors formed of sheet fabric and having overlapping folded edge portions and secured together at their edges by a plurality of threads, one of which extends in zigzag arrangement over the top of the overlapping portions of the said sectors, and another extending through points of the adjoining sectors outside of the overlapping areas to engage and retain the loops, one of the sectors having a short slit located on a bias with respect to the threads of the fabric of the sector, the edges of the slit being stitched bound to prevent fraying of the fabric about the slit, a toy play-balloon located within the casing, the neck of the balloon extending through the slit.

In witness whereof I have hereunto signed my name to this specification.

CLARENCE C. COLLETTE.